United States Patent [19]
Ellis

[11] 3,891,918
[45] June 24, 1975

[54] LINEAR DISPLACEMENT TRANSDUCER UTILIZING AN OSCILLATOR WHOSE AVERAGE PERIOD VARIES AS A LINEAR FUNCTION OF THE DISPLACEMENT

[76] Inventor: James F. Ellis, R.R. No. 2, Box 248, Powell, Tenn. 37849

[22] Filed: July 16, 1973

[21] Appl. No.: 379,567

Related U.S. Application Data

[63] Continuation-in-part of Ser. No. 127,319, March 23, 1971, abandoned.

[52] U.S. Cl............ 324/34 D; 331/181; 334/74; 336/130
[51] Int. Cl............................................. G01r 33/00
[58] Field of Search ........ 324/34 R, 34 D, 34 P, 40; 331/65, 181; 336/30, 130; 340/195; 73/308, 313; 33/143 L, 147 N, 148 H, 172 E, 174 L; 334/74, 75, 76

[56] References Cited
UNITED STATES PATENTS

| | | | |
|---|---|---|---|
| 2,368,857 | 2/1945 | McClellan | 334/75 |
| 2,414,224 | 1/1947 | Douglas | 324/34 D |
| 2,489,114 | 11/1949 | Vladimir | 334/75 |
| 2,525,438 | 10/1950 | Wuenfel | 331/181 |
| 3,513,408 | 5/1970 | McGee | 331/65 |

FOREIGN PATENTS OR APPLICATIONS

| | | | |
|---|---|---|---|
| 555,732 | 6/1943 | United Kingdom | 334/76 |
| 857,464 | 12/1960 | United Kingdom | 324/34 PS |

*Primary Examiner*—Robert J. Corcoran

[57] ABSTRACT

A measuring system comprises a transducer producing a time varying function, a digital counter, and a reference oscillator to produce a direct digital measurement of a displacement. Axial displacement of a movable component of a variable inductor causes the average period of a self-contained oscillator to vary as a linear function of the measured displacement. A single coaxial cable provides the necessary electrical connections to the transducer. Linear components used in the variable inductor produce a linear output function derived from a complex combination of square and square-root functions. Deviations from true linearity are compensated. The device is particularly useful where precise, high resolution, displacement measurements are made over a relatively short range, or where such measurements are multiplexed for computer data storage and analysis.

18 Claims, 7 Drawing Figures

LINEAR DISPLACEMENT TRANSDUCER UTILIZING AN OSCILLATOR WHOSE AVERAGE PERIOD VARIES AS A LINEAR FUNCTION OF THE DISPLACEMENT

BACKGROUND OF THE INVENTION

The invention described herein was made in the course of or under a contract with the U.S. Atomic Energy Commission.

CROSSREFERENCE TO RELATED APPLICATION

This application is filed as a Continuation in Part of my copending application for a LINEAR VARIABLE FREQUENCY OSCILLATOR SYSTEM FOR DIMENSIONAL MEASUREMENTS, Ser. No. 127 319, filed Mar. 23, 1971, now abandoned.

FIELD OF THE INVENTION

This invention relates to those devices which represent a physical quantity in terms of an electrical quantity or function. In particular, it relates to precision transducers of the types used in metrology and related arts. Its intended applications are either similar or identical to those which now employ linear variable differential transformers (LVDT), but its signals, and the way in which they are treated, are quite different.

THE PRIOR ART

Linear vaiable differential transformers (LVDT) are widely used for making measurements of relatively small displacements where an electrical gage of high accuracy is required. Essentially, they comprise a primary and two secondary windings variably coupled by a magnetic core. The primary winding is excited with an alternating current of fixed amplitude and frequency causing the movable core to become an a-c magnet. The voltage induced in each secondary winding is then proportional to the coupling provided by the core, and varies linearly with core displacement within certain limits. By axially locating the secondary windings at opposite ends of the primary winding, an increase in coupling to one results in a decrease in coupling to the other.

One example of an earlier LVDT is shown by Mestas in U.S. Pat. No. 2 408 524. Inventions by Ashcroft (U.S. Pat. No. 2 459 210), Schaevitz (U.S. Pat. No. 2 461 238), and others followed. In some of the earlier devices, the outputs of the two secondary windings were merely bucked against each other and the resulting unbalance read by a meter. To achieve greater accuracy and stability, more recent LVDT systems connect the two secondary windings in series opposition. Using an output amplifier followed by a synchronous rectifier bridge, both the off-null core displacement and its direction are defined in terms of voltage and polarity.

In spite of various improvements, the LVDT still has certain characteristic disadvantages. For example, it is difficult if not impossible to construct such a transducer which does not have at least some slight assymetry in its secondary windings or interconnecting cables. Phase shifts resulting from stray capacitance or other leakage of energy between primary and secondary circuits can cause troublesome errors, especially in systems employing long cable runs. The self-contained excitation shown in U.S. Pat. No. 3 456 132 reduces this problem. In U.S. Pat. No. 3 474 332, Brown discloses a two-winding device similar to an LVDT but connected to a multivibrator in such a way that the on-time of each half is affected by the inductance of its respective winding. Core position is indicated by an integrated measurement of the current balance between the halves of the multivibrator.

If data from a large number of LVDT transducers are processed by a digital computer, the individual outputs must be scanned and their analog signals converted to some digital format before the data can be entered into the computer. A typical LVDT system is made more complex by this requirement, and the errors introduced in making the analog to digital conversion are added to those already existing in the analog system.

The increasing use of digital electronics calls for an increasing use of digital transducers. One way to construct a digital transducer system is disclosed by McGee in U.S. Pat. No. 3 513 408, in which the displacement of a long, tapered magnetic core determines the inductance of an annular coil to vary the frequency of a self-contained oscillator as a linear function of the displacement. McGee's transducer depends primarily on the core's taper to produce its linear function. While variable-frequency displacement transducers having long tapered cores may be well suited for applications requiring large displacements or long strokes, they may not be so well suited for short strokes requiring great precision in minute displacements, because the tapering of the core and the relative size of the coil become very critical.

BRIEF SUMMARY OF THE INVENTION

The objective of my invention is to provide a linear electrical displacement transducer system having the following features:
1. A direct digital output,
2. High accuracy and linearity over a relatively small displacement,
3. High stability,
4. Freedom from errors caused by variations in signal amplifiers or transmission lines,
5. Compatibility with existing digital equipment and multiplexing systems,
6. Straightforward construction using components which can be made to very close tolerances and easily duplicated, and
7. Requirements for only a single coaxial cable leading from the transducer.

The transducer of my invention is a variable oscillator whose average period varies as a linear function of the axial displacement of a movable member, or members, of a variable inductor. In contrast to the prior art, complex square and square-root functions are combined to produce a linear function and permit the use of linear (rather than tapered) components. Compensation is provided for and can be added to increase the range and linearity of the transducer. An electronic system is provided which produces a direct digital output of the transducer's displacement. A single coaxial cable provides direct current for operating the transducer's oscillator and transmits a low level a-c signal back to a data processing location where it controls the gating of a digital counter which counts the output pulses from a fixed-frequency oscillator. The counter thus functions as a time interval meter which measures the relative average period of the transducer's oscillator.

THEORY OF OPERATION

My invention is based upon the premise that a high-frequency time-varying function can be generated and measured to a given high accuracy with less difficulty and at less expense than a voltage or other analog.

When a resonant circuit is made up primarily of inductance and capacitance, its resonant frequency ($f$) may be calculated by the equation $$f = \frac{1}{2\pi \sqrt{LC}}$$

Where: $L$ is the inductance in henrys, and $C$ is the capacitance in farads. Conversely, the period ($T$) is expressed as $$T = 2\pi \sqrt{LC}$$

and therefore varies in proportion to the square root of either the inductance or the capacitance, provided the other remains constant. The inductance of a coil may be closely approximated by the expression $$L = \frac{1.26 \, N^2 \, A \, u}{10^8 \, l}$$

where: $N$ is the number of turns in the coil, $A$ is the core cross section in square centimeters, $u$ is the permeability of the core, and $l$ is the core length in centimeters.

If a cylindrical core of ferrite or other suitable magnetic material be inserted part way into the end of a cylindrical coil, it might appear that the coil's inductance would vary in linear proportion to the core's insertion due to the linear relationship of permeability and inductance. This would be true if the permeability of the entire coil were to vary evenly as a linear function of core insertion, which it does not. If the core be of relatively high permeability, then it will be the preferred path for the magnetic flux lines induced in that portion of the coil it occupies. The core increases the permeability only of that portion of the coil it occupies. Therefore, the effect is to divide the coil into two regions of high and low permeability. As the core is inserted, it effectively adds turns to the coil region having higher permeability, causing the variable quantity to be coil turns rather than permeability. This fact is essential to the operation of my invention. As the magnetic core is inserted into the coil, additional turns are occupied in linear proportion thereto, but the inductance thus added is proportional (by reason of the $N^2$ term in the equation) to the square of the additional turns occupied.

Remembering that the period of an L C resonant circuit varies as the square root of inductance and that the inductance of a cylindrical (or other "long" coil) varies as the square of the linear core insertion, it becomes apparent that the period of an oscillator thus controlled should vary as a linear function of relative core insertion. Making allowances for core losses and end fringing effects, my experiments have verified this relationship. This linear relationship does not hold if frequency be the measured quantity, since it is the reciprocal of period; neither does it hold if the coil be made too long or if the permeability of the core be made too low. For best operation, the magnetic core must be free from eddy currents and magnetic losses caused by hysteresis. It should provide temperature characteristics which are well known, as well as physical and mechanical stability. Magnetic materials are now commercially available which provide these required characteristics.

In contrast to the effect of the insertion of a magnetic core into a coil, the insertion of a nonmagnetic core having a high electrical conductivity will introduce eddy currents which will oppose the oscillating magnetic field and disable the portion of the coil occupied. When the coil is otherwise made to be closely self-coupled, the insertion of an eddy-current core produces a linear effect opposite to that produced by inserting a magnetic core. Similarly, a concentric sleeve can be moved axially over the coil to produce a linear change in period. If a coil be wound as a single layer on a magnetic core, and a nonmagnetic metallic sleeve be closely positioned part way over it; the portion of the coil within the sleeve will be effectively disabled. Axial displacement of the sleeve will effectively add or subtract turns from the coil to produce the linear function desired. While the magnetic core is not essential in this case, it does inhance the response. A linear function can also be produced by a sleeve which effectively adds turns to the high permeability region of the coil. This can be accomplished by making the sleeve of magnetic material.

In variable inductors like the ones described, there is no longer the progressive change in the self coupling of the coil when the ends of the core or sleeve approach the ends of the coil. When the parts are fully meshed or fully withdrawn, the linear function ceases. Absolute linearity occurs only when one end of the variable member is near the center of the coil and the other end is well extended. However, a response differing from absolute linearity by only ±0.34 percent over a range of 0.300 inches has been produced without compensation using a coil slightly longer than one inch. The same assembly produced a response differing by less than ±0.02 percent from absolute linearity over a range of 0.075 inches. By the addition of compensation which is described in the DETAILED DESCRIPTION OF THE INVENTION, the transducer's linearity is further improved and its range is extended.

DETAILED DESCRIPTION OF THE INVENTION

Figure 1:
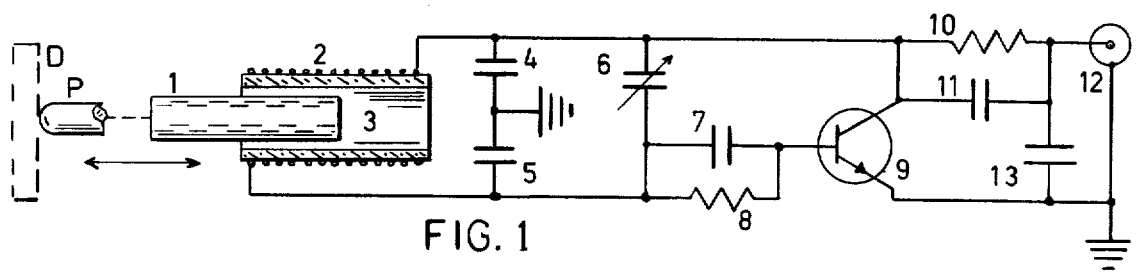
FIG. 1 shows the essentials of a typical transducer, including a schematic diagram of a suitable oscillator and a sectional view of the variable inductor used to determine its period.

FIG. 1 shows the essentials of the transducer of my invention. A d-c voltage is applied at the coaxial connector 12 causing current to flow through resistor 10 turning on transistor 9 and causing the circuit to oscillate. Resistor 8 furnishes bias to the transistor base while capacitor 7 acts as a high-frequency coupler. Coil 2 and capacitors 4 and 5 comprise the main resonant circuit which determines the frequency of the oscillator. The coil form 3 is made of any suitable material, but fused quartz or ceramic materials are preferred because of their excellent mechanical stability. Test object D presses against the plunger P moving it axially. The precision-ground magnetic core 1 is moved into the cylindrical coil 2 by a distance equal to the depression of P. The portion of the coil occupied by core 1 is inhanced according to the principles described under THEORY OF OPERATION, causing the period of the oscillator to vary as linear function of the core's displacement. The values for resistor 10 and capacitors 11 and 13 are chosen to allow only a small amount of the oscillator's stored energy to be coupled back to the coaxial connector 12. Variable capacitor 6 provides trimming of the transducer's oscillator.

Figure 2:
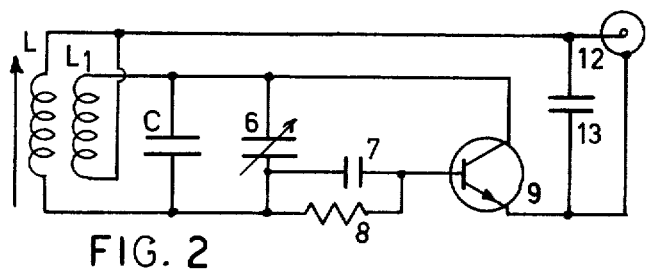
FIG. 2 is a schematic diagram showing a suitable transducer oscillator employing a bifilar wound coil used as the primary controlling inductor.

FIG. 2 is a schematic diagram showing another oscillator suitable for use in the transducer of my invention. This oscillator differs from the one shown in FIG. 1 by using bifilar windings L and $L_1$ to replace the single coil 2, and eliminate the need for dividing the tuning capacitors 4 and 5. The need for coupling components 10 and 11 is also eliminated. The principles which govern the production of a linear period apply to the single winding and the bifilar winding alike. The bifilar arrangement permits the use of a center tap as a d-c feed point. To feed a single winding at a center tap is not recommended because the shifting electrical center of the coil resulting from axial motion of the core would result in a slight distortion of the otherwise linear period function. The invention is not restricted to the oscillator circuits shown in FIGS. 1 and 2, which are typical of circuits that have been proven satisfactory.

Figure 3:
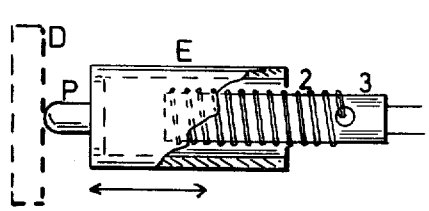
FIG. 3 is an inverted arrangement of variable inductor components where the outside member becomes the controlling element.
Figure 4:
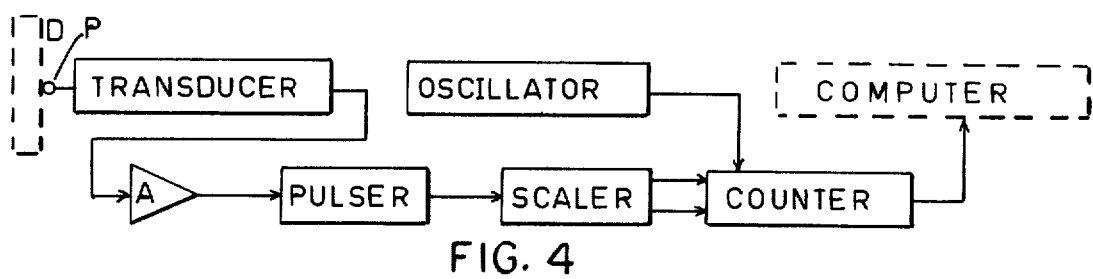
FIG. 4 is a block diagram of a typical measuring system.

FIG. 3 shows an inverted arrangement of the variable inductor elements of FIG. 1. Depression of the plunger P by object D moves the sleeve E over the coil 2 effectively shorting out the enclosed turns by reason of the eddy currents induced in the sleeve. The coil form 3, preferably made of a high quality molded and precision ground magnetic material, provides the coil with close self-coupling. The progressive shorting of turns effected by the sleeve E reduces the number of active turns along the core (in this case the coil form itself) and, by reason of the $N^2$ term in the equation for inductance, causes the coil's inductance to vary according to a square function of the sleeve's displacement. When coil 2 is connected to the remaining elements of the circuit (see FIG. 1), this square function combines with the square root function in the equation for period to produce an output period which varies as a linear function of displacement. In FIG. 1, inward displacement increases the period whereas in FIG. 3, inward displacement decreases the period. FIG. 4 is a block diagram of a typical embodiment of the invention. Test object D displaces plunger P inwardly into the transducer. Low voltage d-c power to operate the transducer's variable oscillator is provided by the amplifier A or any other convenient source, and is supplied to the transducer via a common coaxial cable. The low-level output signal of the transducer (often a sine wave) is amplified by (A) and triggers the pulser which in turn generates an output pulse for each cycle of the incoming wave. A variety of circuits for producing trigger pulses is known to those experienced in the art. The pulser, in turn, triggers the input of the scaler, which divides by some fixed number.

At the beginning of a measurement cycle, the scaler produces an output pulse which starts the counter simultaneously with the beginning of the scaler's division. At the end of the division when a given number of pulses has been scaled, the scaler produces another output pulse which stops the counter. The oscillator provides a continuous train of pulses which are counted while the counter is gated on. At the end of each measurement cycle, the output of the counter is displayed by a digital readout, and the devices are reset to begin all over again. It is often the practice to cause the existing output number to be held in the readout display until the next cycle is completed and the next output number is ready for display.

In the manner described, the counter acts as a timeinterval meter. Since the fundamental frequencies of the transducer and the oscillator are usually of the same order of magnitude, it is necessary to divide the transducer's frequency by a fairly large number in order to hold the counter on for a sufficient time to accumulate the required number of counts (cyclic events from the oscillator). The numerical resolution of the system is determined by the frequency and deviation of the transducer, the frequency of the oscillator, and the division ratio of the scaler. As the division ratio of the scaler is increased, the system resolution is also increased but the cycling time for each reading (measurement cycle) becomes longer. Digital counters which include the functions of trigger-pulse generator, scaler, and internal time-base oscillator are commercially available and can be used instead of the individual units described.

By thus using a derivative of the transducer's signal as a clock to control the on-time of the counter or time-interval meter, and a time-base (reference) signal from the oscillator as the counted frequency; the counter is made to read out the relative average period of the incoming signal from the transducer. By properly tuning both the transducer and the oscillator, the number displayed by the time-interval meter (counter) is made to vary directly in engineering units according to the displacement measured by the transducer. By establishing an arbitrary number as a zero reference, all counts in excess thereof will represent the measured displacement directly in the selected units. This latter function can be performed by a computer, or, as an alternate method, the counter can be wired so that it shows only that count which is in excess of the zero reference number. The counter's output may be displayed for visual reading and/or directly connected to a computer or other suitable digital equipment.

As mentioned earlier under THEORY OF OPERATION, absolute linearity of response is realized only when the magnetic core is inserted about half way into the coil. Although the transducer does provide reasonably good linearity over a limited range using only an uniform core and coil, its performance can be greatly improved by a gradual bunching of the windings toward each end of the coil. If the coil is made shorter, the bunching must be increased. A limit is reached when the coil becomes so short that only two annular windings remain which have a short space between them.

Figure 5:
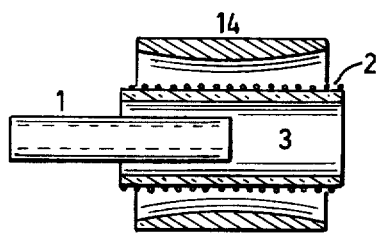
FIG. 5 shows an eddy-current sleeve used for error compensation.

FIG. 5 is a sectioned view showing a compensating sleeve 14 surrounding the coil 2, the coil form 3, and the magnetic core 1. In this arrangement, the coil's windings are spaced in an uniform manner throughout. The compensating sleeve, in this case, is made of a nonmagnetic metal having good electrical conductivity. The inside of the sleeve is contoured to have a smaller diameter in the center than at the ends. By induced eddy currents, the sleeve creates a slight electromagnetic restriction in the center of the coil which compensates for the errors in linearity which would otherwise occur as the ends of the core approach the ends of the coil. The advantage which the compensating sleeve holds over a compensated coil is that the sleeve can be removed and trimmed to produce the exact compensation required for any given transducer. Once wound and bonded, the coil can not be altered. It is possible to compensate by both methods at the same time.

Figure 6:
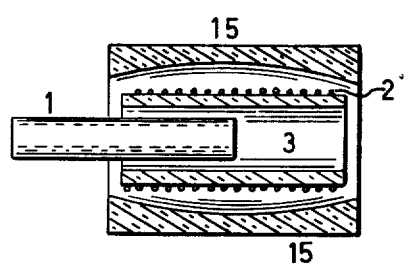
FIG. 6 shows a magnetic sleeve used for error compensation.

FIG. 6 shows a method of error compensation similar to that shown in FIG. 5, except for the fact that a magnetic material is used, requiring that the inside contour be reversed. The magnetic sleeve 15 creates a slight magnetic preference for the coil-turns near the ends to offset the natural preference for those near the center of the coil. Magnetic core 1, coil 2, and coil from 3 have the same relationship as in the previous figures.

A metallic eddy-current core may be substituted for the magnetic cores shown in FIGS. 1, 5, and 6, in which case the effect of inserting the core is reversed. The eddy-current sleeve E shown in FIG. 3 may also be replaced with a magnetic sleeve, in which case, its effect is also reversed. The preferred magnetic components are made of high quality powdered magnetic material that is combined with a suitable binder, molded, hard fired, and precision ground to very close tolerances. The eddy-current components are preferably made of high-conductivity non-magnetic materials, usually metals.

Although not required, the coils of the variable inductors shown in FIGS. 1, 3, 5, and 6 are preferably wound as single layers, with the windings securely bonded to the forms. The preferred operating frequencies are in the one to twenty-megahertz range, depending on the size of a given transducer. While cylindrical coils, cores, and sleeves are preferred, those with cross sections of other shapes may be used. The coils shown in FIGS. 3, 5, and 6 may be of either the bifilar or single winding types.

Figure 7:
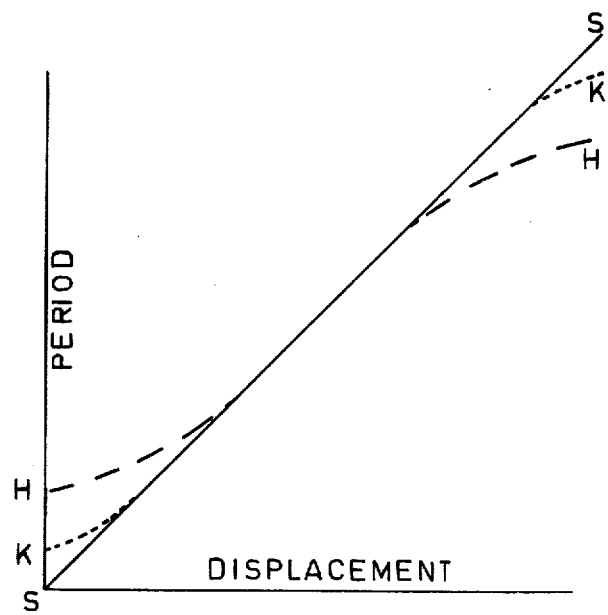
FIG. 7 is a graph of the transducer's response both before and after error compensation.

FIG. 7 is a graph showing the relative output period of the transducer as a function of displacement. The solid line S represents the ideal linear response over the entire length of the coil and core interface. The broken line H shows the response of a typical transducer before any linearity correction is made. The dotted line K indicates the transducer's response after linearity correction has been made. Although the range of displacement shown covers the full interface of the variable inductor from minimum to maximum, displacement is restricted to the linear region in normal operation. The range of period shown extends from an arbitrary minimum to an arbitrary maximum.

I claim as my invention:

1. In an apparatus for measuring a dimensional quantity, in combination
    a variable inductor comprising
        an inductive coil,
        means interfacing with a portion of the length of said coil, said means axially movable in a direction parallel to the axis of said coil, and varying the inductance of said coil as a square function of the relative axial displacement of said coil and said means interfacing, and
        means mechanically coupling to the measured dimensional quantity and effecting said relative axial displacement;
    a variable oscillator comprising in part
        said variable inductor and controlled at least in part thereby, and producing a periodic output time-varying in proportion to said relative axial displacement; and
    means receiving said periodic output and measuring the period thereof relative to a suitable reference, and yielding therefrom a measure of said dimensional quantity.

2. A transducer system for measuring a dimensional quantity, comprising
    a variable inductor having at least two partially interfacing parts, at least one of said parts being fixed and at least one of said parts being axially displaceable, each of said parts being of nearly uniform composition and cross-sectional area;
    said variable inductor having an inductance varying as a square function of an axial displacement of at least one of said parts;
    at least one capacitor connected in parallel with said variable inductor forming a resonant circuit whose period varies as a square-root function of inductance;
    a variable oscillator frequency-controlled by said resonant circuit, said oscillator producing an alternating current whose period varies as a linear function of said axial displacement by combination of said square function and said square-root function;
    means connecting a direct-current input to said variable oscillator;
    means taking a periodic-current output from said variable oscillator; and
    means receiving said periodic-current output and measuring the relative period thereof producing a proportional measure of the axial displacement of said axially displaceable part.

3. The invention defined in claim 2, wherein said at least two partially interfacing parts are a fixed coil, and a movable magnetic core.

4. The invention defined in claim 2, further comprising
    a compensating sleeve fixed surrounding said variable inductor, said sleeve being made of an electrically conducting material and having a contoured inside bore larger at the ends than in the center.

5. The invention defined in claim 2, further comprising
    a compensating sleeve fixed surrounding said variable inductor, said sleeve being made of a magnetic material and having a contoured inside bore smaller at the ends than in the center.

6. The invention defined in claim 2, wherein said at least one of said parts being fixed is
    a coil having fewer turns per unit length in the center than at the ends.

7. The invention defined in claim 2, wherein said at least one of said parts being fixed is a bifilar-wound coil.

8. The invention defined in claim 2, wherein said at least one of said parts being fixed is
a coil, and said at least one of said parts being axially displaceable is
a core of nonmagnetic material having high electrical conductivity.

9. The invention defined in claim 2, wherein said at least one of said parts being fixed is
a coil, and said at least one of said parts being axially displaceable is
a sleeve of nonmagnetic material having high electrical conductivity.

10. The invention defined in claim 2, wherein said at least one of said parts being fixed is
a coil, and said at least one of said parts being axially displaceable is
a sleeve of magnetic material.

11. The invention defined in claim 2, wherein said means receiving said periodic-current output and measuring the relative period thereof comprises
a digital counter;
means time-gating said digital counter on in proportion to the period of said periodic output;
a second oscillator providing pulses counted by said digital counter when said counter is gated on; and
a digital output means interconnected with said digital counter.

12. A transducer system for measuring a dimensional quantity, comprising
a variable inductor having at least two coaxially interfacing parts, at least one of said parts being fixed and at least one of said parts being axially displaceable, each of said parts being of nearly uniform composition and cross-sectional area;
said variable inductor having an inductance varying as a square function of an axial displacement of at least one of said parts;
at least one capacitor connected in parallel with said variable inductor forming a resonant circuit whose period varies as a square-root function of inductance;
a variable oscillator frequency-controlled by said resonant circuit, said oscillator producing an alternating current whose period varies as a linear function of said axial displacement by combination of said square function and said square-root function;
means for connecting a direct-current input to said variable oscillator;
means taking a periodic-current output from said variable oscillator;
a digital counter;
means time-gating said digital counter on in proportion to the period of said periodic output;
a second oscillator providing pulses counted by said digital counter when said counter is gated on; and
a digital output means interconnected with said digital counter and yielding a number variable in proportion to said axial displacement.

13. The invention defined in claim 12, wherein said at least one of said parts being fixed is
a coil; and said at least one of said parts being axially displaceable is
a core.

14. The invention defined in claim 12, wherein said at least one of said parts being fixed is
a coil; and said at least one of said parts being axially displaceable
is a sleeve.

15. The invention defined in claim 12, wherein said at least one of said parts being fixed is
a coil having fewer turns per unit length in the center than at the ends, and wound on a core of magnetic material; and said at least one of said parts being axially displaceable
is a sleeve.

16. The invention defined in claim 12, wherein said at least one of said parts being fixed is a bifilar-wound coil.

17. The invention defined in claim 12, further comprising
a compensating sleeve fixed coaxially surrounding said variable inductor, said sleeve being made of an electrically conducting material and having a contoured inside bore larger at the ends than in the center.

18. The invention defined in claim 12, further comprising
a compensating sleeve fixed coaxially surrounding said variable inductor, said sleeve being made of a magnetic material and having a contoured inside bore smaller at the ends than in the center.

* * * * *